(12) United States Patent
Lewis

(10) Patent No.: US 6,877,380 B2
(45) Date of Patent: Apr. 12, 2005

(54) DIAPHRAGM FOR BONDED ELEMENT SENSOR

(75) Inventor: Brian D. Lewis, Los Gatos, CA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/676,951

(22) Filed: Sep. 30, 2003

(65) Prior Publication Data

US 2004/0134283 A1 Jul. 15, 2004

Related U.S. Application Data

(60) Provisional application No. 60/414,661, filed on Oct. 1, 2002.

(51) Int. Cl.[7] ................................. G01L 7/08
(52) U.S. Cl. ....................................... 73/715
(58) Field of Search .......................... 73/715, 721, 724, 73/727, 720

(56) References Cited

U.S. PATENT DOCUMENTS

| | | | | |
|---|---|---|---|---|
| 6,148,673 A | * | 11/2000 | Brown | 73/721 |
| 6,279,402 B1 | * | 8/2001 | Fisher | 73/754 |
| 6,401,545 B1 | * | 6/2002 | Monk et al. | 73/756 |
| 6,444,487 B1 | * | 9/2002 | Boggs et al. | 438/48 |
| 6,713,828 B1 | * | 3/2004 | Chavan et al. | 257/415 |
| 6,725,724 B2 | * | 4/2004 | Glück | 73/715 |

* cited by examiner

*Primary Examiner*—Edward Lefkowitz
*Assistant Examiner*—Andre Allen
(74) *Attorney, Agent, or Firm*—Kris T. Fredrick

(57) ABSTRACT

A pressure sensor device for producing a signal indicative of a pressure of a fluid to be monitored, including a housing having a fluid conduit for receiving the fluid to be monitored and a diaphragm positioned at an end of the fluid conduit. The diaphragm includes at least first and second portions, wherein a thickness of the first portion is less than a thickness of the second portion. A transducer is bonded to a surface of the first portion of the diaphragm and including piezoresistive elements for sending the signal. Preferred is a circular second portion and an annular first portion around the outer edge of the second portion. The housing is preferably tubular and includes an annular shoulder for mounting the diaphragm, along with an annular groove on the outer surface of the first portion and connecting the first portion to the annular shoulder.

20 Claims, 2 Drawing Sheets

DIAPHRAGM FOR BONDED ELEMENT SENSOR

This application claims the benefit of Provisional Application No. 60/414,661, filed Oct. 1, 2002.

FIELD OF THE INVENTION

The present invention relates in general to sensor assemblies that include bonded element semiconductor transducers and, more particularly, to a diaphragm that supports the bonded element semiconductor transducer within the sensor assembly.

BACKGROUND OF THE INVENTION

Pressure transducers are widely used in the semiconductor industry for ultra-high-purity gas pressure measurement in process lines. A pressure transducer develops an electrical signal that is proportional to the pressure applied. An ideal pressure transducer design minimizes the effects of temperature, mechanical stress, and aging on the output signal so as not to compromise the semiconductor fabrication process. In actuality, transducers respond to environmental effects, and only some of the effects can be easily compensated through signal conditioning. Others are impossible to correct and add unpredictable variation to pressure measurement.

Correctable errors are typically proportional to temperature or pressure. Transducers can have linear and nonlinear (typically second-order) temperature effects for both zero-pressure output and span. The raw span and offset signals with respect to pressure may also require correction and can be nonlinear. These repeatable errors can be readily corrected by the transducer manufacturing using a variety of analog or digital compensation schemes.

In classic analog compensation, linear errors are routinely compensated with passive or active direct current circuits. The second-order errors, while more difficult, can be handled by nonlinear analog feedback via temperature sensors or by digital correction. As long as errors are repeatable, they are correctable and can be eliminated with proper signal conditioning.

While correctable errors are somewhat problematic for the transducer manufacturer, it is the non correctable errors that cause concern for the transducer user. Environmental effects such as humidity, that can affect the accuracy of a transducer can be unrepeatable, and are much more difficult or impossible for the transducer manufacturer to predict and correct. Examples of non correctable effects include case tress susceptibility, hysteresis, creep, and long-term stability.

An example of case stress would be a shift in the offset of the device due to mounting installation-related stress. The degree of stress applied is different in each application and is hard to predict. If the raw sensor element and package are not designed to reject such stresses, it will be impossible for the manufacturer to eliminate the offset instability caused when the user mounts the sensor in the field. Creep, hysteresis, and long-term offset shift are three other effects that can be time, temperature, humidity and/or pressure related and impossible to eliminate. If a transducer exhibits any of these characteristics, the transducer will require frequent calibration that always adds process variation, unpredictability, and replacement cost, and possibly even downtime.

High-purity transducer applications involve stringent material control and manufacturing techniques to ensure fluid purity of semi-corrosive liquids and gasses. Gas delivery lines are often welded into place, which makes component replacement difficult and costly, and also induces welding stress that can cause transducer errors. In addition, high-purity chemical processing, whether for semiconductor fabrication or any other application, inherently involves highly corrosive environments and requires an absence of chemical and particulate contamination. Any surface exposed to process gasses and liquids must be resistant to corrosion, and maintain smooth, non-particle-retaining surfaces. A transducer used in the system must also adhere to these requirements.

The high-purity market has traditionally used capacitive and Wheatstone bridge-based pressure transducers. Each technology has advantages and disadvantages, and selection has always required certain compromises. Wheatstone bridge designs use strain-sensitive resistors strategically placed on a diaphragm or bean, such that the resistance increases proportionally to the strain change. The resistors (typically four) are arranged into a fully active bridge with two increasing and two decreasing in resistance.

Microelectromechanical systems (MEMS) based transducers generally rely on piezoresistive strain gauges to translate pressure into electrical signals. The piezoresistive effect is based on the change in the mobility of charge carriers in a resistor due to a change in mechanical stress, thus changing the resistance. Piezoresistive bridges typically produce over sixty times more signal that foil gauges for the same applied pressure.

What is still desired is a new and improved ultra-high-purity gas pressure sensor for use with low pressures. Among other features and benefits, the new and improved ultra-high-purity sensor will preferably provide greater sensitivity to pressure changes.

Other advantages and features will appear hereinafter.

SUMMARY OF THE INVENTION

The present invention provides a pressure sensor for producing a signal indicative of a pressure of a fluid to be monitored. The pressure sensor includes a housing having a fluid conduit for receiving the fluid to be monitored, and a diaphragm positioned at an end of the fluid conduit and including at least first and second portions, wherein a thickness of the first portion is less than a thickness of the second portion. The sensor also includes a transducer bonded to a surface of the first portion of the diaphragm and including piezoresistive elements.

It has been found that the diaphragm of the present invention increases the sensitivity of the sensor. In one exemplary embodiment, the present invention comprises an improved ultra-high-purity gas pressure sensor for use with low pressures. In another exemplary embodiment, an improved ultra-high-purity gas pressure sensor constructed in accordance with the present invention incorporates a MEMS pressure transducer, mounted on a stainless steel diaphragm using a high temperature bonding process.

BRIEF DESCRIPTION OF THE DRAWINGS

For a more complete understanding of the invention, reference is hereby made to the drawings, in which.

In the figures, like reference characters designate identical or corresponding components and units throughout the several views.

DETAILED DESCRIPTION OF THE PREFERRED EMBODIMENT

Figure 1:
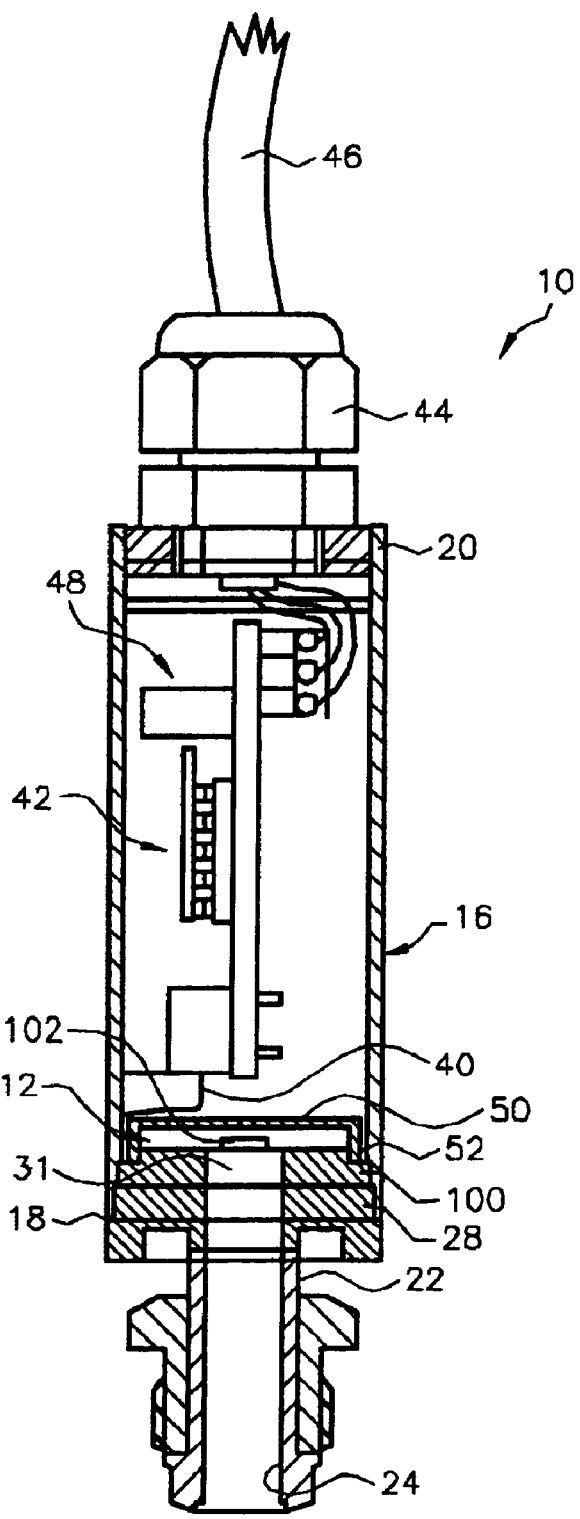
FIG. 1 is a cross-sectional view of an exemplary embodiment of a pressure assembly constructed in accordance with the present invention.

Referring to FIG. 1, an exemplary embodiment of an ultra-high-purity gas pressure sensor assembly 10 constructed in accordance with the present invention is shown. The pressure sensor assembly 10 uses a microelectromechanical system (MEMS) pressure transducer 12 mounted on a stainless steel diaphragm 102 to measure the pressure of a fluid. The pressure transducer 12 is preferably mounted on the diaphragm 102 using a high temperature bonding process.

The pressure sensor assembly 10 includes a tubular housing 16 having first and second opposing ends 18, 20. A connector 22 seals the first end 18 of the housing 16 and defines a fluid conduit 24. The connector 22 enables the pressure sensor assembly 10 to be coupled to a pressure vessel or similar pressurized environment containing gas to be monitored, so that the fluid conduit 24 communicates with the gas. An exemplary connector 22 is shown, but the pressure sensor assembly 10 can be provided with other types of process connectors.

Figure 2:
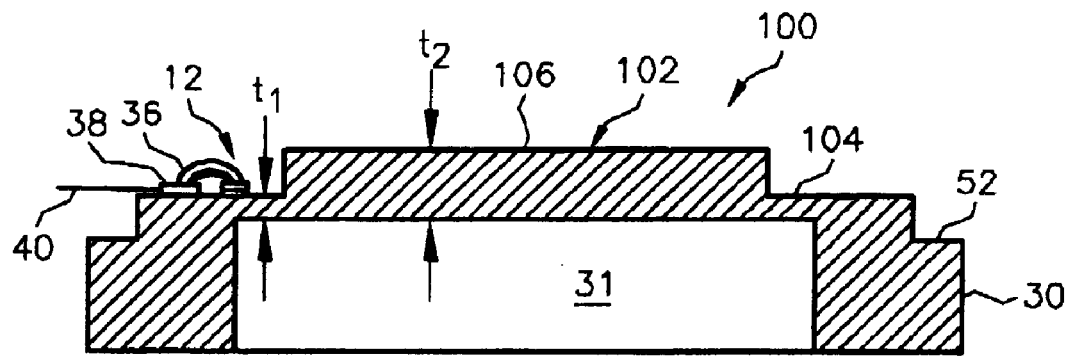
FIG. 2 is an enlarged sectional view of the pressure sensor assembly of FIG. 1.
Figure 3:
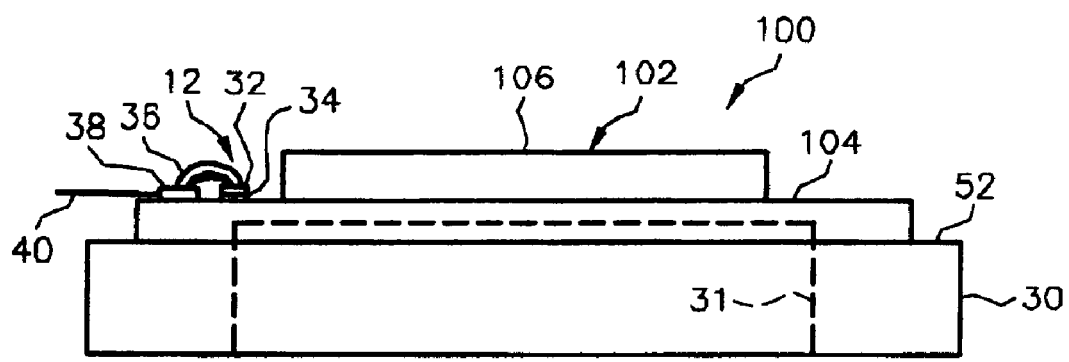
FIG. 3 is an enlarged side elevational view of the diaphragm of the pressure sensor assembly of FIG. 1.

A diaphragm structure 100 is contained within the housing 16 and attached to the connector 22 through an annular member 28. The metal diaphragm structure 100, which is also shown in FIGS. 2 and 3, includes an annular side wall 30 and the diaphragm 102 that together form a fluid chamber 31 communicating through the annular member 28 with the fluid conduit 24 of the connector 22. Since the fluid chamber 31 communicates with the fluid conduit 24 and the fluid conduit communicates with the fluid being monitored, the pressure within the fluid chamber 31 changes as the pressure of the monitored fluid changes. The diaphragm 102 proportionally deforms as a result of the change in pressure within the fluid chamber 31. The, annular member 28 helps to isolate the diaphragm structure 100 from mounting/external stresses produced by the connector 22.

A first surface of the diaphragm 102 faces the fluid chamber 20. As shown in FIGS. 2 and 3, the semiconductor transducer 12 is disposed on a second surface of the diaphragm 102, facing away from the fluid chamber 20, and includes a silicon sensor die 32 secured to the diaphragm 102 with a glass bond 34. Piezoresistive elements (not shown) of the silicon sensor die 32 are preferably configured as a Wheatstone bridge. Techniques for diffusing piezoresistive elements within the silicon die 32 or mounting piezoresistive elements to the silicon die 32 are well known in the art. since the piezoresistive elements are silicon based and the sensor die 32 is silicon, both elements share a generally equivalent coefficient of thermal expansion, thereby preventing stress from occurring between the die and the piezoresistive elements based on thermal expansion.

Wire bonds 36 extend from the piezoresistive elements of the silicon transducer 12 to a printed circuit board 38 secured to the diaphragm structure 100, and wires 40 connect the printed circuit board to sensor electronics 42, as shown in FIG. 1. A wire connector 44 closes the second end 20 of the housing 16, and an electrical output connection wire 46 extends through the wire connector 44 and connects to the sensor electronics 42 through external pots 48. The pressure sensor assembly 10 of FIG. 1 also includes a cover 50 secured to a shoulder 52 of the diaphragm structure 100 with a weld such that the transducer 12 is enclosed between the diaphragm 102 and the cover 50 in a fluid-tight manner. The sensor assembly 10, however, can alternatively be configured for absolute, gauge, sealed gauge, and vacuum pressures.

The diaphragm 102 has at least first and second portions 104, 106, wherein a thickness "$t_1$" of the first portion 104 is less than a thickness "$t_2$" of the second portion 106, and the silicon transducer 12 is secured to a surface of the first portion 104 of the diaphragm 102. The difference in thickness of the portions 104, 106 of the diaphragm 102 helps concentrate stress in the thinner first portion 104, such that the thinner first portion 104 obtains a larger deflection for a given change in pressure. The larger deflection, in turn, causes the transducer 12 to produce a larger output signal, whereby the sensitivity of the pressure sensor assembly 10 is increased.

In the embodiment shown, the diaphragm 102 includes only two portions 104, 106. The second portion 106 is circular and the first portion 104 is annular and is coaxially arranged about the second portion. The thinner, annular first portion 104 acts as a stress concentration point within the overall diaphragm structure 100, whereby any stress deformation within the diaphragm 102 is mostly experienced at the thinner, annular first portion 104. The piezoresistive elements of the transducer 12 are disposed above the thinner first portion 104 so as to measure the larger deflections experienced across the first portion. In the embodiment shown, the first surface of the diaphragm 102 is substantially flat and substantially contained in a single plane, such that the thickness of the first portion 104 and the thickness of the second portion 106 of the diaphragm each extend from the first surface.

Figure 4:
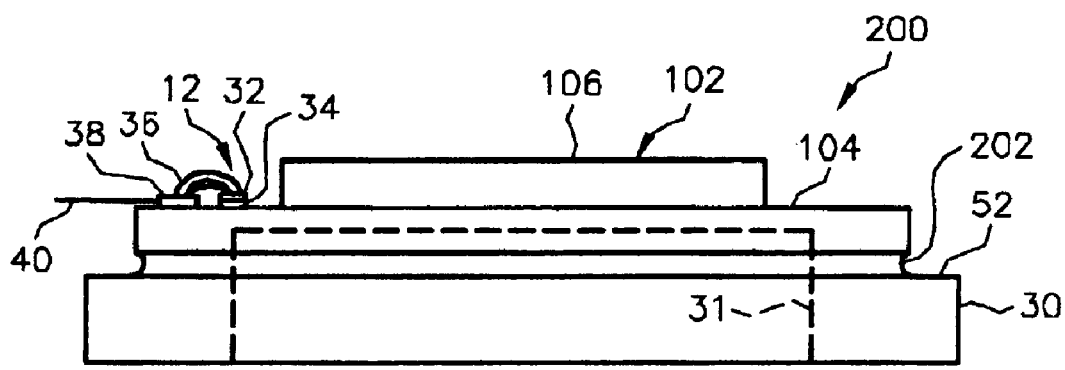
FIG. 4 is a side elevational view of another exemplary embodiment of a diaphragm constructed in accordance with the present invention.

Referring to FIG. 4, another exemplary embodiment of an improved diaphragm structure 200 of the present invention is shown. The improved diaphragm 200 is similar to the improved diaphragm structure 100 of FIGS. 2 and 3 such that similar elements have the same reference numerals. The diaphragm structure 200 of FIG. 4, however, further includes a stress isolation groove 202 that helps isolate the diaphragm 102 from any mounting/external stresses produced by the connector 22 and the housing 16 of the pressure sensor assembly 10. In the embodiment shown in FIG. 4, the stress isolation groove is provided as a radially outwardly facing circumferential groove 202 in the side wall 30 of diaphragm structure 200.

Present industrial transducers are limited to a minimum of about 100 psi because of the inability to recover from irregular disturbances. They lack the sensitivity to small changes in pressure. The transducer of the present invention, however, is capable of operating at as low as 5 psi or lower because of the multiple portions of the diaphragm with different thicknesses. The present invention concentrates stress in the thinner region of the diaphragm and obtains more deflection. The larger deflection results in a larger output signal for a given thickness, which allows the sensor to function at remarkably lower pressures and with greater sensitivity. Additionally, no increase in cost is incurred with the present invention.

The present invention, therefore, provides improved diaphragm structures for use as part of an ultra-high-purity gas pressure sensor for measuring low pressures. In one embodiment, the improved diaphragm structures are made of stainless steel and the pressure transducer is mounted on the diaphragm using a high temperature bonding process.

While particular embodiments of the present invention have been illustrated and described, they are merely exemplary and a person skilled in the art may make variation sand modifications to the embodiments described herein without departing from the spirit and scope of the present invention. All such equivalent variations and modifications are intended to be included within the scope of this invention, and it is not intended to limit the invention, except as defined by the following claims.

What is claimed is:

1. A pressure sensor device for producing a signal indicative of a pressure of a fluid to be monitored, comprising:
   a housing having a fluid conduit for receiving the fluid to be monitored;
   a diaphragm positioned at an end of the fluid conduit and including at least first and second portions, wherein a thickness of the first portion is less than a thickness of the second portion; and
   a transducer bonded to a surface of the first portion of the diaphragm to measure deformation of said first portion and including piezoresistive elements, said transducer including electronics for sending and processing said signal.

2. The device of claim 1, wherein said transducer is a MEMS pressure transducer.

3. The device of claim 2, wherein said diaphragm is a stainless steel diaphragm and said MEMS pressure transducer is mounted to said diaphragm by a high temperature bonding process.

4. The device of claim 1, wherein said housing is cylindrical.

5. The device of claim 1, wherein said second portion is circular and said first portion is annular around the outer edge of said second portion.

6. The device of claim 1, wherein said housing is tubular and said first end includes an annular shoulder for mounting said diaphragm thereon.

7. The device of claim 6, which further includes an annular groove on the outer surface of the first portion and connecting said first portion to said annular shoulder, whereby groove isolates said diaphragm from stress from said housing.

8. A pressure sensor device for producing a signal indicative of a pressure of a fluid to be monitored, comprising:
   a housing having a fluid conduit means for receiving the fluid to be monitored;
   diaphragm means for responding to said pressure and positioned at an end of the fluid conduit means and including at least first and second portions, wherein a thickness of the first portion is less than a thickness of the second portion; and
   transducer means including electronics for sending and processing said signal, said transducer means being bonded to a surface of the first portion of the diaphragm means to measure deformation of said first portion and including piezoresistive elements.

9. The device of claim 8, wherein said transducer means is a MEMS pressure transducer.

10. The device of claim 9, wherein said diaphragm means is a stainless steel diaphragm and said MEMS pressure transducer is mounted to said diaphragm by a high temperature bonding process.

11. The device of claim 8, wherein said housing is cylindrical.

12. The device of claim 8, wherein said second portion is circular and said first portion is annular around the outer edge of said second portion.

13. The device of claim 8, wherein said housing is tubular and said first end includes an annular shoulder for mounting said diaphragm means thereon.

14. The device of claim 13, which further includes an annular groove on the outer surface of the first portion and connecting said first portion to said annular shoulder, whereby groove isolates said diaphragm means from stress from said housing.

15. In a pressure sensor device for producing a signal indicative of a pressure of a fluid to be monitored, including a housing having a fluid conduit for receiving the fluid to be monitored and a transducer including piezoresistive elements, said transducer including electronics for sending and processing said signal, the improvement comprising:
   a diaphragm positioned at an end of the fluid conduit and including at least first and second portions, wherein a thickness of the first portion is less than a thickness of the second portion; and
   said transducer being bonded to a surface of the first portion of said diaphragm to measure deformation of said first portion.

16. The device of claim 15, wherein said transducer means is a MEMS pressure transducer said diaphragm is a stainless steel diaphragm, said MEMS pressure transducer being mounted to said diaphragm by a high temperature bonding process.

17. The device of claim 15, wherein said housing is cylindrical.

18. The device of claim 15, wherein said second portion is circular and said first portion is annular around the outer edge of said second portion.

19. The device of claim 15, wherein said housing is tubular and said first end includes an annular shoulder for mounting said diaphragm means thereon.

20. The device of claim 19, which further includes an annular groove on the outer surface of the first portion and connecting said first portion to said annular shoulder, whereby groove isolates said diaphragm means from stress from said housing.

* * * * *